(No Model.)

T. VANTUYL.
HANDLE BAR.

No. 603,671. Patented May 10, 1898.

WITNESSES:

INVENTOR
T. Vantuyl
BY
ATTORNEYS.

UNITED STATES PATENT OFFICE.

THOMAS VANTUYL, OF NICHOLS, IOWA.

HANDLE-BAR.

SPECIFICATION forming part of Letters Patent No. 603,671, dated May 10, 1898.

Application filed September 2, 1896. Serial No. 604,665. (No model.)

*To all whom it may concern:*

Be it known that I, THOMAS VANTUYL, of Nichols, in the county of Muscatine and State of Iowa, have invented a new and Improved Handle-Bar, of which the following is a full, clear, and exact description.

The object of the invention is to provide a new and improved handle-bar which is simple and durable in construction and arranged to permit the rider to conveniently adjust the arms independently of each other and in either a longitudinal or transverse direction.

The invention consists principally of handle-arms adjustably held in bearings adjustable in the head of the handle-bar stem.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
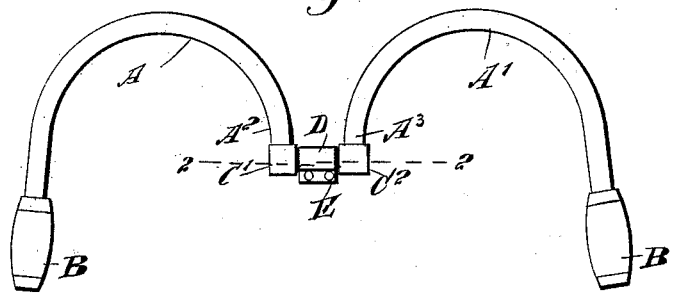
Figure 2:
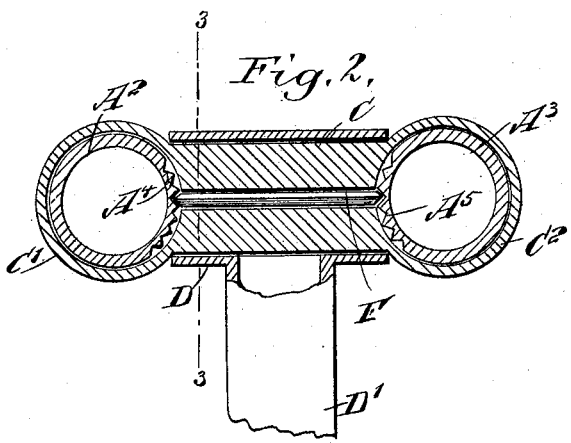
Figure 3:
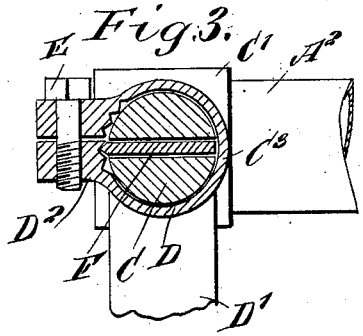
Figure 4:
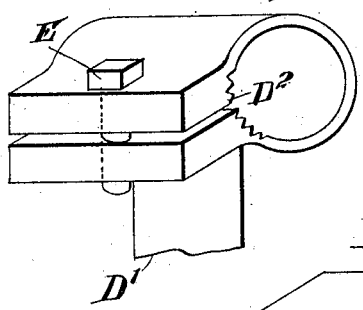
Figure 5:
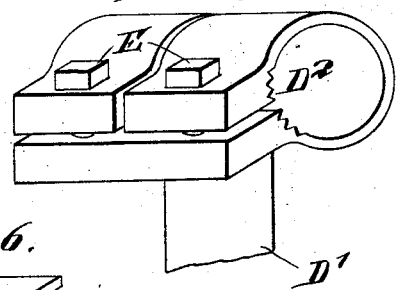
Figure 6:
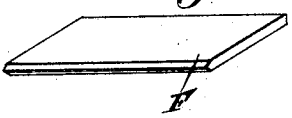

Figure 1 is a plan view of the improvement. Fig. 2 is an enlarged cross-section of the same on the line 2 2 of Fig. 1. Fig. 3 is a sectional side elevation of the same on the line 3 3 of Fig. 2. Fig. 4 is a perspective view of the stem-head. Fig. 5 is a similar view of a modified form of the same, and Fig. 6 is a perspective view of the key.

The improved handle-bar is provided with two curved arms A A', formed at their outer ends with suitable grips B, adapted to be taken hold of by the rider. The inner and longitudinally-extending ends $A^2$ $A^3$ of the said arms A A' are fitted into the bearings C' $C^2$, respectively, of a fitting C, mounted to turn in a transversely-extending head D, secured on the upper end of the handle-bar post or stem D', as is plainly shown in the drawings. The head D is preferably split transversely and, if desired, partly longitudinally, as indicated in Fig. 5, and the split ends are united with each other by a clamping screw or screws E, so as to clamp the fitting C in position in the head whenever desired.

The fitting C is provided with a recess for a key F, formed at its ends and at the front into teeth, of which the end teeth engage correspondingly-shaped notches $A^4$ $A^5$, formed on the ends $A^2$ $A^3$ of the handle-bars A A', and the front tooth of said key is adapted to engage one of a series of notches $D^2$, formed on the split end of the head D.

It is evident that when the key F is removed the handle-bars A A' can be readily turned in the bearings C' $C^2$ to swing laterally, and at the same time the fitting C may be turned in the transversely-extending head D to bring the grips B to the desired height. Thus a double adjustment can be given to the handle-bars A A' by swinging the same laterally and by turning the same longitudinally with the fitting C in the head D. When the desired adjustment is made, the key F is fitted in place and the clamping-screw E is screwed up, so as to securely fasten the key in place to hold both the fitting C and the handle-arms in position.

Having thus fully described my invention, I claim as new and desire to secure by Letters Patent—

1. A handle-bar provided with a transversely-extending fitting formed at its ends with longitudinal bearings, handle-arms engaging with their inner ends the said bearings and a handle-bar stem having a head in which the said fitting is mounted to be turned and secured after adjustment, and a key held in the said fitting and adapted to lock the latter to the head and the handle-arm ends to the said bearings, substantially as described.

2. A handle-bar, comprising a handle-bar stem formed with a head having internal notches, a fitting mounted to turn in the said head, and formed at its ends with bearings, handle-arms engaging with their inner, longitudinal ends the said bearings, and a key held in the said fitting and engaging notches in the handle-arm ends and notches in the said head, substantially as shown and described.

3. A handle-bar, comprising a handle-bar stem formed with a head having internal notches, a fitting mounted to turn in the said head and formed at its ends with bearings, handle-arms engaging with their inner, longitudinal ends the said bearings, a key held in the said fitting and engaging notches in the handle-arm ends and notches in the said head, and a clamping-screw for the split end of the said head, substantially as shown and described.

THOMAS VANTUYL.

Witnesses:
J. W. VANTUYL,
W. S. BAKER.